UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

METAL-CASTING.

1,023,604.  Specification of Letters Patent.  Patented Apr. 16, 1912.

No Drawing.  Application filed June 30, 1911. Serial No. 636,270.

*To all whom it may concern:*

Be it known that I, EZECHIEL WEINTRAUB, a citizen of the United States, residing at Lynn, in the county of Essex, State of Massachusetts, have invented certain new and useful Improvements in Metal-Casting, of which the following is a specification.

This application is a continuation in part of my prior application, Serial No. 524,949, filed October 27, 1909.

My present invention relates to the purifying and casting of metal and is applicable to copper or its alloys, and to other metals as for example silver.

For many years there has been a demand for copper castings free from blow holes, and of good electrical conductivity. Copper, when in molten condition, dissolves oxygen, nitrogen, carbon monoxid, and other gases, and the gases are set free on cooling, thus producing blow holes, and greatly impairing the mechanical strength and decreasing the electrical conductivity of the cast copper. Silver acts in a similar manner. Further, molten copper containing dissolved gases does not flow freely in a mold and will not take sharp outlines. The addition of aluminum, magnesium, phosphorus, and other materials to the melted copper has been tried for removing the gases by chemical combination. Unfortunately, however, all these substances alloy readily with copper, and slight traces of any of these elements in the copper will greatly lower the electrical conductivity of the same.

Pure boron, or any boron compound in which the state of oxidation of boron is lower than its usual one in boric anhydrid, possess properties which make them peculiarly useful for the solution of the important technical problem of producing sound copper castings of high conductivity. These properties are: first, a high affinity for oxygen, nitrogen and various other gases; second, no chemical affinity for copper, and third, the property of forming an easily fusible slag of boric anhydrid.

By the expression state of oxidation lower than the anhydrid, I mean to include boron material which is capable of being oxidized to form boron trioxid,—in other words, a boron material which is in a condition favorable for combination with oxygen, and other dissolved gases. This term would therefore include such material as boron carbid which is capable of being oxidized to form boron trioxid. Of course, as pointed out above, the addition of substances capable of alloying with copper must be avoided.

I have found that if I add to the crucible of molten copper of ordinary chemical purity a small quantity of boron varying between $\frac{1}{50}$ of one per cent. and $\frac{1}{10}$ of one per cent., or a boron compound containing an equivalent amount of boron in a reduced state, that is, in a state of oxidation lower than its usual one, $B_2O_3$, the castings are free from blow holes or flaws, and have an electrical conductivity as high as 95 or 98 per cent. of the Matthiessen standard. The castings reproduce faithfully all the details of the mold.

If pure boron is to be used for treating the copper prior to casting, it is obtained by reducing boron chlorid with hydrogen in an alternating current arc maintained between the water-cooled copper electrodes, all of which is fully described by me in my copending application, Serial No. 524,939, filed Oct. 27, 1909. Processes for obtaining elemental boron are also described in my previous Patents Nos. 997,879, July 11, 1911, and 1019392, March 5, 1912. However, for the purpose of my invention the addition of pure boron is not necessary. The carbid of boron is entirely suitable for carrying out my invention. Boron carbid is prepared by heating a suitable mixture of boric oxid, $B_2O_3$, and carbon to the reaction temperature in an electric resistance or arc furnace or by any other suitable means, the process being analogous to the well known process of making silicon carbid. Care must be taken to start with pure raw materials and so to carry out the operation that no impurities are introduced, such as silicon, aluminium, etc., which would lower the conductivity of the cast copper or silver. By working with reaction mixtures of considerable quantity a very pure product can be secured by rejecting the outer portions of the reaction product which may have come into contact and become contaminated with the material constituting the walls of the furnace.

The boron carbid is added to the fusion of copper or other metals in small quantities, varying from one-tenth per cent. to one per cent. depending upon the content of boron in the carbid, on the nature of the mold, the nature of the metal to be cast, etc.

While in the preferred form of my invention I use the carbid of boron as described above I may employ, with equally good results, the product of the reaction between magnesium and boric anhydrid. This product is a material rich in boron and containing magnesium or oxygen, depending upon the conditions of the reaction.

When the reaction between the boric anhydrid and the magnesium is carried out with the use of an excess of boric anhydrid and at a temperature of 1300° C. or preferably higher, the product, after being washed with dilute sulfuric acid to dissolve out magnesium borate and unacted upon boric anhydrid, is substantially free from magnesium. It is a substance of somewhat variable composition but its composition approximates that required by the formula $B_7O$. It, therefore, may be termed a suboxid of boron. This substance because of its low degree of oxidation is a deoxidizer and is converted to the form of boric anhydrid $B_2O_3$. The same holds true if the boron contains magnesium, as is the case when the above reaction is carried out with no excess of boric anhydrid or when the temperature is relatively low. As only a small amount of boron is required to bring about the beneficial result in the copper, the amount of magnesium introduced into the copper is negligible and it affects but little the conductivity. While boron carbid possesses advantages as a deoxidizing and degasifying material over the suboxid of boron on the one hand by its cheapness and over the unpurified magnesium reduction product of boric anhydrid by reason of being cheaper, non-hydroscopic and by yielding less slag, these latter substances may still be used to good advantage in the casting of copper.

As a convenient method of introducing boron into the copper I place the boron material in the bottom of the crucible or pot mixed with pure charcoal and cover it with the metal to be melted. During the process of melting the deleterious gases are removed from the fusion by the boron material and the fused slag consisting largely of boric acid is retained by the charcoal. The boron material also may be conveniently introduced by inclosing it in a copper capsule and stirring it into the melt.

The copper is not injured by the addition of an excess of boron, as the excess of boron does not combine with the copper but either burns and collects as a slag at the top of the copper or else remains as traces in the copper merely as mechanical admixture and therefore not affecting appreciably its properties.

While my process may be practiced by simply melting the copper in contact with the boron material, it is preferable in some instances to superheat the melted copper, especially when stirring the boron material into the copper and when using a sand mold. The melting point of copper is about 1080° C. and it is common practice to pour the molten metal at a temperature of about 1100° C. By the term superheat I mean a temperature considerably above this point. This temperature may be as high as 1350° C. or even higher. The amount of superheat will be governed by the conditions under which the casting is made. The pouring temperature, of course, will be governed by the degree of fluidity desired in the metal and will vary with the nature of the casting.

By the practice of the described process I have made copper castings which I term boronized castings in complex shape, such, for instance, as yokes for electrical recording meters. These are made either in sand molds, or in preheated iron molds, and in the latter case were so complete in detail as to need little or no machining before being put in place in the meter. Induction motor rotors of the squirrel-cage type can readily be made, the rings and transverse conductors being cast all at a single melt directly in place on the machine core. Copper alloys, such as gun metal and bronze, are also benefited by the additions of small quantities of boron just before pouring. In general, the advantage of the boron treatment extends to melts containing gases, such as oxygen, nitrogen and the like, either combined or free, but of such composition that the boron will not unite directly with the metal or metals of the melt to form a boride.

While in the ordinary foundry this method represents the one way of producing sound copper castings of high conductivity, a process, known as "poling," is at present utilized in the operation of smelting the crude copper and copper ores. This process is uncertain and crude, and requires skilled labor, and frequently leads to overpoling or underpoling, and the copper produced thereby has on an average a conductivity of about 85 per cent., on account of the gases evolved by the green poles employed in the process. I wish it to be understood that my process of casting copper with the use of boron applies equally well to preparing copper for casting in the smelting operation. It has a decided advantage over the poling method, as it is reliable, giving always the same results; requires no skilled labor, and produces a better cast metal.

What I claim as new and desire to secure by Letters Patent of the United States, is:—

1. The method of removing gases contained in molten metal with which boron does not readily combine which consists in adding thereto a boron material in an oxidizable state while said metal is molten.

2. The method of treating metal with which boron does not combine which consists in adding to the metal while molten a non-metalliferous boron material in a condition capable of combining with gaseous impurities, the amount of said material being slightly in excess of that required to eliminate the impurities.

3. The method of treating copper which consists in incoporating therein, while molten, a boron material in a condition capable of combining with oxygen and of a quantity sufficient to free the resulting product from undesired compounds and gases.

4. The method of treating molten copper bearing metal which consists in incorporating therewith boron material in a state of oxidation lower than boric anhydrid.

5. The method of treating molten copper containing impurities which consists in incorporating with said copper boron in a state of oxidation lower than boric anhydrid and proportioned to leave in the resulting product not to exceed one-tenth of one per cent. boron.

6. The method of increasing the conductivity and soundness of cast copper which consists in adding to the copper while molten boron material in a state capable of combining with oxygen or other gaseous impurities, said material being proportioned to leave in the resulting product not to exceed traces of boron material uncombined with the copper.

7. The method of treating a fusion containing a metal of the copper group which consists in incorporating therein while heated to a temperature considerably above its melting point, a quantity of an oxidizable boron material sufficient to free the resulting product from undesired compounds and gases.

8. The method of increasing the conductivity and soundness of cast copper which consists in incorporating with the copper while heated to a temperature of about 1100°–1350° C. a material containing boron in an oxidizable condition.

9. A firm, dense casting of high electrical conductivity consisting of copper freed from dissolved gases and containing boron material in traces, uncombined with copper.

10. A copper casting characterized by a conductivity of at least 95 per cent. and a sound structure free from blow holes and containing traces of boron material uncombined with copper.

11. As an article of manufacture, a metallic body consisting largely of copper and containing traces of boron uncombined with said metallic body.

12. The method of treating copper which consists in incorporating therein, while molten, a boron material, non-alloyable with copper, and capable of combining with gaseous impurities.

In witness whereof, I have hereunto set my hand this 27th day of June, 1911.

EZECHIEL WEINTRAUB.

Witnesses:
JOHN A. MCMANUS, Jr.,
FRANK G. HATTIE.